United States Patent [19]

Kitamura

[11] Patent Number: 4,475,162
[45] Date of Patent: Oct. 2, 1984

[54] OUTPUT DEVICE FOR PROVIDING INFORMATION BY SCAN

[75] Inventor: Takashi Kitamura, Yokohama, Japan

[73] Assignee: Canon Kabushiki Kaisha, Tokyo, Japan

[21] Appl. No.: 298,461

[22] Filed: Sep. 1, 1981

[30] Foreign Application Priority Data

Sep. 11, 1980 [JP] Japan ................................. 55-125314

[51] Int. Cl.³ .............................................. G06F 3/14
[52] U.S. Cl. .................................... 364/523; 364/518; 340/745; 340/721
[58] Field of Search ................. 340/721, 745, 755; 178/15, 30; 364/523, 518, 519

[56] References Cited

U.S. PATENT DOCUMENTS

| | | | |
|---|---|---|---|
| 3,624,632 | 11/1971 | Ophir | 340/745 |
| 3,686,662 | 8/1972 | Blext et al. | 340/745 |
| 3,906,480 | 9/1975 | Schwartz et al. | 340/745 |
| 4,081,604 | 3/1978 | Kanaiwa | 178/30 |
| 4,360,884 | 11/1982 | Okada et al. | 364/521 |

Primary Examiner—Gareth D. Shaw
Assistant Examiner—Ronni S. Malamud
Attorney, Agent, or Firm—Fitzpatrick, Cella, Harper & Scinto

[57] ABSTRACT

There is disclosed an output device for displaying alphanumeric information as well as graphic pattern, which comprises a first dot signal generator for alphanumeric displaying, a second dot signal generator for graphic-pattern displaying and an output unit for deriving the first and second signals to display the alphanumeric and graphic pattern information.

6 Claims, 7 Drawing Figures

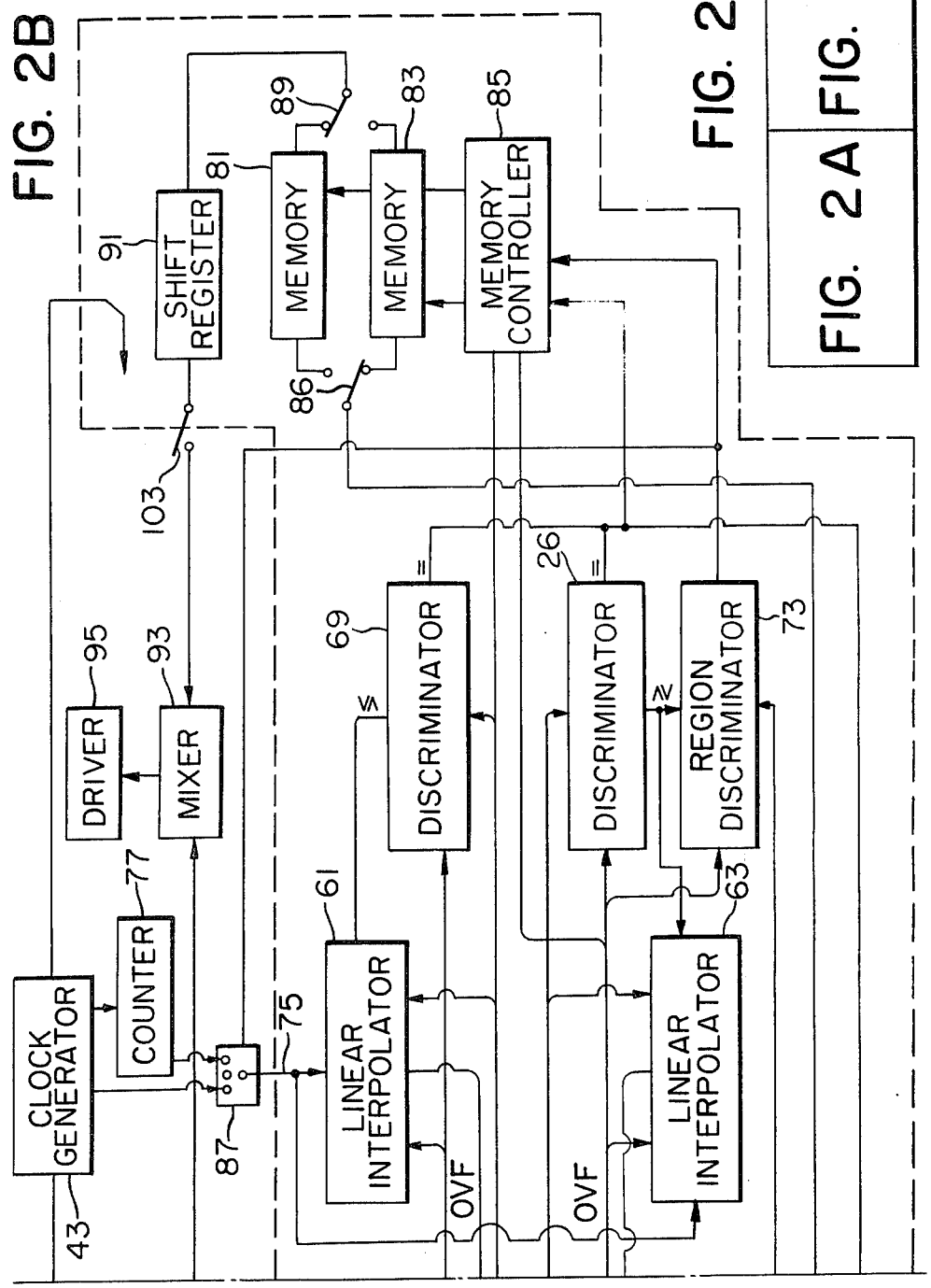

|  | 7 | 6 | 5 | 4 | 3 | 2 | 1 |
|---|---|---|---|---|---|---|---|
| 1st BYTE | TAG BITS | | Y ADDRESS 5 MORE SIGNIFICANT BITS | | | | |
| 2nd BYTE | TAG BITS | | | $Y_2$ | $Y_1$ | $X_2$ | $X_1$ |
| 3rd BYTE | TAG BITS | | Y ADDRESS 5 MID-SIGNIFICANT BITS | | | | |
| 4th BYTE | TAG BITS | | X ADDRESS 5 MORE SIGNIFICANT BITS | | | | |
| 5th BYTE | TAG BITS | | X ADDRESS 5 MID-SIGNIFICANT BITS | | | | |

OUTPUT DEVICE FOR PROVIDING INFORMATION BY SCAN

BACKGROUND OF THE INVENTION

1. Field of the Invention

The present invention relates to an output device for providing information by scanning an output medium, and more particularly to an output device capable of providing a line segment connecting specified coordinate points on a record medium.

2. Description of the Prior Art

It is frequently desired to provide character information and graphic information on a single record paper. The graphic information includes normal graphic patterns as well as pattern information of predetermined form such as frame lines, ruled lines or trademarks. In such a case, it has been proposed to print character information on a record paper having a predetermined graphic pattern form printed thereon. With this method, however, when a number of graphic patterns forms are included, a number of different record papers which conform to those forms must be prepared. As a result, the number of types of record paper to be stocked increases and the record paper has to be replaced each time a different form is used.

It has been also proposed to define form information in an output of a computer as a series of special characters, in addition to character information and record the character information and the graphic information on one record paper. The graphic information is processed separately so that the defined form information is sequentially recorded. By regarding the graphic information as form information having a series of special characters, the hardware required for implementing this method need not be large or complex. The cost of such hardware is relatively low and the data transfer time is short. However, in order for any type of graphic patterns to be regarded as form information, software of large volume is required and the computers which can be used for that purpose are necessarily restricted.

A pattern processing system in which a graphic pattern is regarded as a combination of line segments and in which vector data is processed by specifying start points and end points of the line segments is briefly explained below.

A plotter or an X-Y recorder is well known as a graphic output device. However, spot movement in forward and backward directions on an X-axis and a Y-axis, which is employed in the plotter or X-Y recorder, cannot be utilized in a raster scan type recording apparatus. In the raster scan type apparatus, the following method is usually employed. A memory having a sufficiently large memory capacity (approximately 6 M-bits) to store dot information for one page of size A4 record paper is prepared. A processor processes start point and end point information of the vector data, and positions of the line segments connecting the start points and the end points, represented in the form of dots, are written in the memory of the recording apparatus. All vector data are processed in this manner and written in the memory. Subsequently, the data are sequentially read from the memory and recorded on the record paper or other record medium. This system requires a memory having capacity which is large enough to store one page of information at a time. Accordingly, the memory must be of large size, which leads to an increase of cost. When different graphic information, e.g. form information is to be alternately outputted, another memory for storing graphic information data is additionally required. Consequently, the cost of the memories further increases.

SUMMARY OF THE INVENTION

It is an object of the present invention to provide an inexpensive raster scan type output device which can attain the same pattern processing as well-known plotters or X-Y recorders do, based on vector data supplied from a computer with a small capacity memory.

It is another object of the present invention to provide an output device which can record or display a complex graphic pattern with a raster scan system having a small capacity memory.

It is a further object of the present invention to provide an output device which can output character information and graphic information with an output from a computer without substantially reducing character information data transfer efficiency and while simplifying user software for preparing the graphic data.

In accordance with the present invention, a vector data train supplied from the computer is temporarily stored in a memory. When a start of record is instructed, the data are read from the memory, decoded and converted to dot information by a processor. Let us assume N-sectioned virtual regions along the direction of paper feed of size A4 record paper. Two memories each having a memory capacity corresponding to picture cell information of the sectioned region are provided, and only the dot information contained in a predetermined region is stored in one of the memories. On the other hand, the dot information previously stored in the other memory is read out and recorded on the record paper. When the record paper is moved to the next region, the above store-read-record operation is repeated. By repeating the above operation N times which is equal to the number of sectioned regions, the raster scan type output device can process the graphic information in the form of vector data with smaller capacity memories.

DETAILED DESCRIPTION OF THE PREFERRED EMBODIMENTS

The present invention will now be explained in detail with reference to the accompanying drawings.

Figure 1:
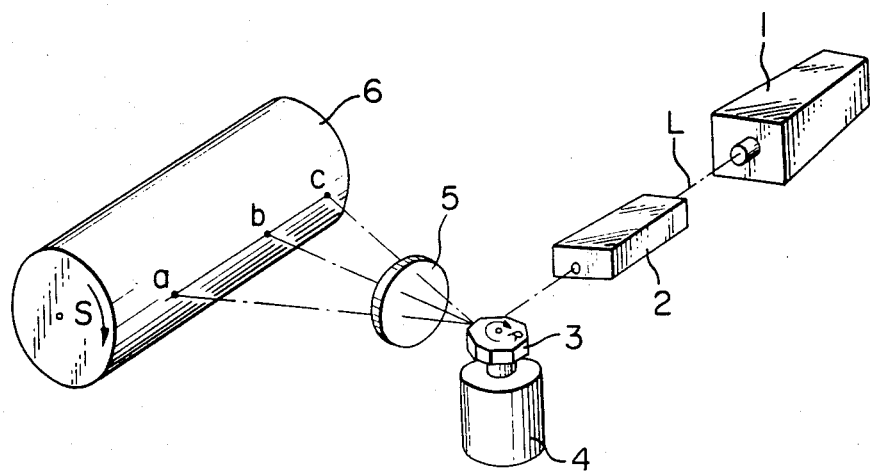
FIG. 1 is a perspective view illustrating the construction of a laser beam type recording apparatus.

FIG. 1 is a perspective view illustrating the construction of a laser beam type recording apparatus in which the output device of the present invention is incorporated. In FIG. 1, a laser beam L emitted by a laser generator 1 is directed to a rotating polygonal mirror 3 through a light modulator 2 which controls the intensity of transmitted light in accordance with an applied electric signal. The rotating polygonal mirror 3 is rotated by a motor 4 at a constant velocity in the direction of an arrow R. The beam reflected from the rotating polygonal mirror 3 is deflected to repeatedly scan a single line position. The reflected beam is focused by a lens 5 and irradiated to a surface of a photo-sensitive drum 6.

By applying a modulation signal such as an image signal to the light modulator 2 and driving the motor 4 and driving the photo-sensitive drum 6 in the direction of arrow S, a desired image is produced on the surface of the drum 6.

The photo-sensitive drum 6 has photo-conductive material such as selenium or cadmium sulfate applied on the surface thereof. An electrostatic latent image is formed by the beam irradiation and it is developed by toner. Thereafter, the toner image is transferred to a sheet of plain paper and is fixed to produce an image printed on the plain paper.

Such a printing process has been well known in the art of electrography and hence the details thereof are not explained here.

Figure 2A:
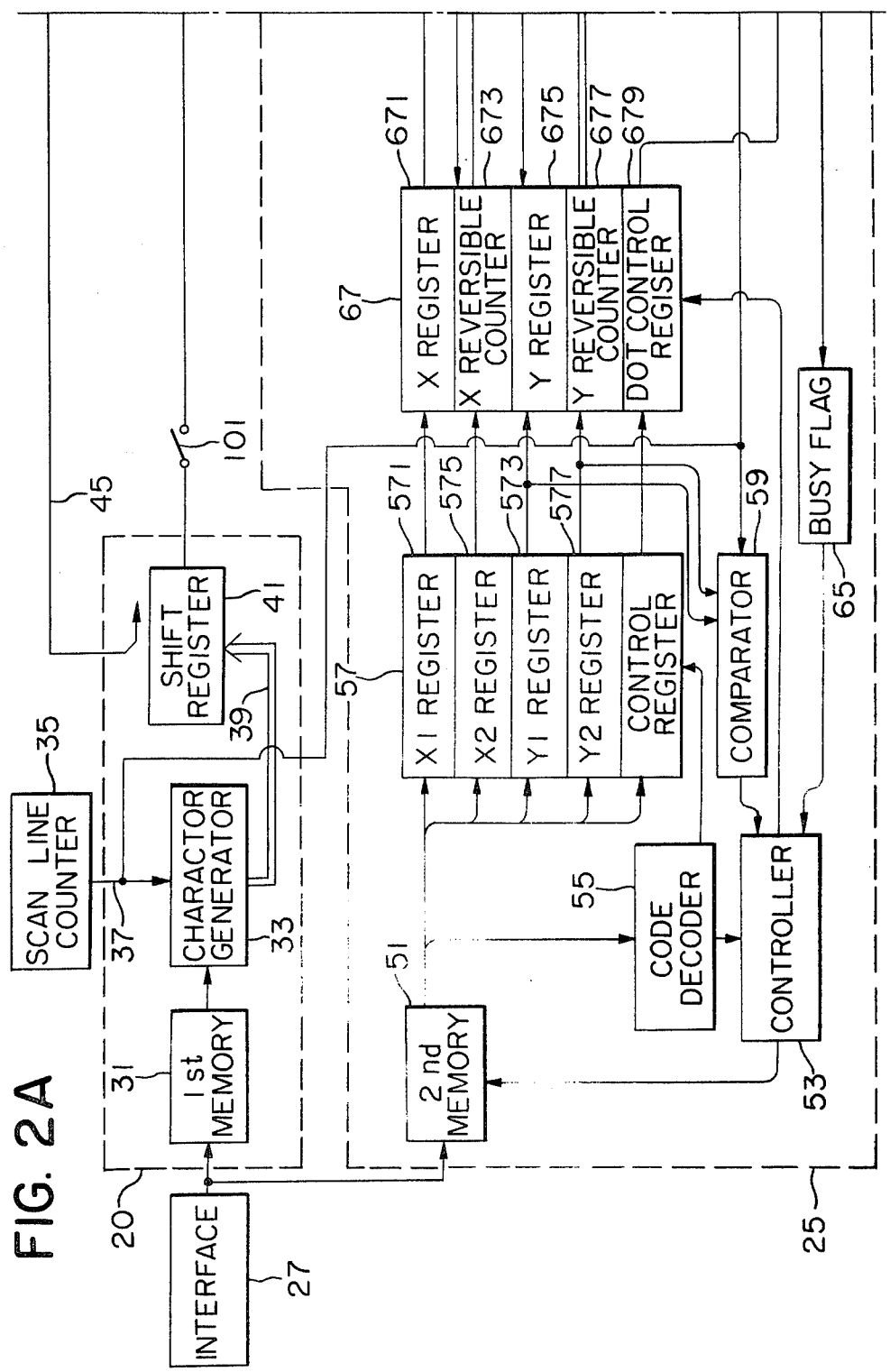
FIG. 2 shows an arrangement of FIGS. 2A and 2B, FIGS. 2A and 2B being a block diagram of a signal forming circuit in accordance with the present invention.

FIGS. 2A and 2B are a block diagram of one embodiment of a signal forming circuit used in the recording apparatus of the present invention. An electric signal produced by the signal forming circuit is applied to the light modulator 2 of the laser beam type recording apparatus shown in FIG. 1 as the modulation signal so that the electrostatic latent image for character information and graphic information is formed on the surface of the photo-sensitive drum 6.

Referring to FIGS. 2A and 2B, a character processing unit 20 reads and processes the character information. A graphic pattern processing unit 25 reads and processes the graphic information. The character processing unit 20 and the graphic pattern processing unit 25 operate independently from each other and the outputs thereof are merely combined. Accordingly, completely different codes may be used in those processing units or a combination of the codes may be used.

An interface unit 27 receives the character information and the graphic information to be recorded represented by coded signals such as EBCDIC or ASCII from an information source (not shown) such as a computer.

The recording process of the input character information will now be explained. A first memory 31 may be a large capacity shift register or random access memory which has a memory capacity large enough to store the coded information corresponding to one page of size A4 record paper (approximately 9 K-bytes). The coded character information is sequentially stored in the memory 31 through the interface unit 27.

As the recording to the record paper is started, instruction for read-out of the coded character information stored in the memory 31 is given and the read-out operation of the memory 31 is started. The coded character information thus read-out is supplied to a character generator 33. A scan signal 37 is supplied to the character generator 33 from a scan line counter 35 which counts the scan line number of a character. A dot signal 39 which represents dot output on the scan line of the character specified by the scan signal 37, in the form of parallel multi-bits, is supplied to a shift register 41.

Let us assume that a character A is formed by nine scan lines. A coded signal for the character A is first supplied and first scan line information is applied to the character generator 33. The character generator 33 then produces a 7-bit dot signal 39 "0011100" in parallel, which is stored in the memory cells of the shift register 41 having seven or more bit positions.

In synchronism with the beam which scans the record medium (photo-sensitive drum 6) shown in FIG. 1, a clock generator 43 supplies a clock signal 45 of a constant frequency to the shift register 41. As a result, the dot outputs are produced in the sequence of C1, C2, C3 . . . as shown in FIG. 3.

After the readout operation of the dot outputs for one scan line of the character has been completed, the read-out of the next character is instructed to the memory 31 and the character information read-out is supplied to the character generator 33. Since the scan line number does not change until the beam completes one scan, the scan signal 37 which indicates the same scan line number for the previous character is supplied. As in the case of the character A, a 7-bit paralled dot signal 39 is supplied to the shift register 41 and it is sequentially read-out in response to the clock signal 45.

When the read-out of the character information for one scan line is completed, the read-out of the character information for the next scan line is initiated. Since this is the read-out for the second scan line, the scan line counter 35 supplies the scan signal 37 indicating the second scan line to the character generator 33.

Figure 3:
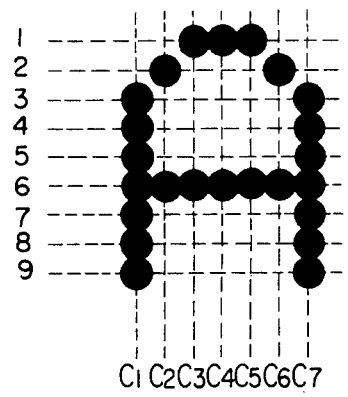
FIG. 3 illustrates a recorded pattern.

In the example shown in FIG. 3, the character is formed by nine scan lines. Accordingly, read-out for one line of character information repeated nine times to complete the read-out of all the record information forming the character. The scan line counter 35 is reset whenever the read-out of the character information lines is completed, and the scan line number indicated by the scan signal 37 is updated.

The graphic pattern processing unit for recording the graphic information will now be explained. A second memory 51 in the graphic pattern processing unit 25 may be a large capacity shift register or random access memory having a memory capacity (approximately 32 K-bytes) large enough to store 5,000 X-coordinates and 5,000 Y-coordinates, that is, start point coordinates and end point coordinates of 5,000 line segments (vectors). With such a memory capacity, a chart can be readily recorded in the form of combination of line segments.

The coded signal in the form of EBCDIC or ASCII codes is supplied from the interface unit 27 with the coded character information eliminated, that is, the graphic coordinate information is sequentially stored in the second memory 51. The graphic information in usually coded vector data.

Figures 4, 5:
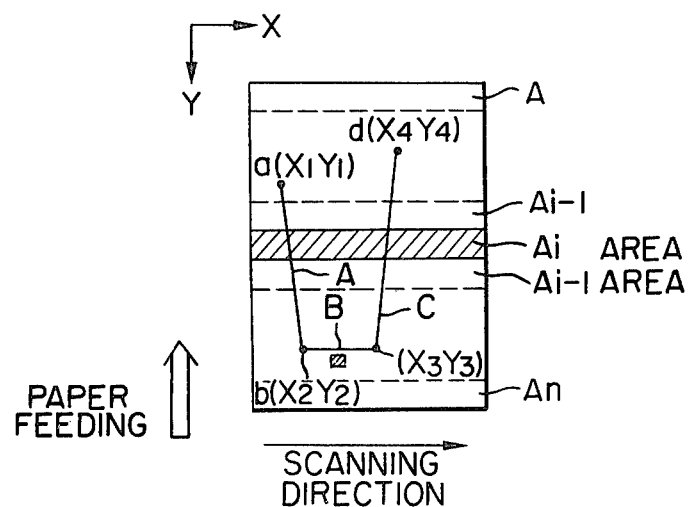
FIG. 4 illustrates a code sequence supplied from a computer.
FIG. 5 shows a relation between sections of a record paper and vectors.

FIG. 4 shows an example of a coded train supplied from the computer. It represents the coded vector data. For example, if the number of points which can be specified is 4096 in both the X-direction and the Y-direction, and the coded signal is in ASCII code, the input coded train is a 5-byte data train as shown in FIG. 4. This 5-byte data train specifies the start point and the next 5-byte data train specifies the end point so that one vector is drawn.

Referring to FIG. 4 in further detail, it indicates the X and Y coordinates of the coordinate start point. X and Y coordinates are represented by 12 bits, respectively. More specifically, two less significant bits of the X coordinate are shown by "$X_2$, $X_1$" (Second byte), the seventh to third bits are shown by "X address 5 mid-significant bits" (fifth byte), the twelveth to eighth bits are shown by "X address 5 more significant bits" (fourth byte). Similarly, two less significant bits of the Y-coordinate are shown by "$Y_2$, $Y_1$" (Second byte), the seventh to third bits are shown by "Y address 5 mid-significant bits" (third byte) and the twelveth to eighth bits are shown by "Y address 5 more significant bits" (first byte).

The present invention may be described further with reference to FIGS. 2 and 5. FIG. 5 shows an output medium (such as size A4 paper or CRT display). In the present invention, the output medium is divided into n regions in the direction substantially normal to the scanning direction (with each region corresponding to 64 or 128 scan lines), and the memories 81 and 83 (FIG. 2B) each has the capacity to store all of the picture cells in one region.

While the picture cell information for the region Ai-1 is being read from the memory 81, a pair of start point coordinates and end pont coordinates are read from the second memory 51 into a register 57, and a comparator 59 determines if the line segment defined by the pair of coordinates passes through the region Ai. If it does not so pass through, a next pair of coordinates are read from the second memory 51 into the register 57 and the comparator 59 determines if the line segment defined by this next pair of coordinates passes through the region Ai. If it is determined that the line segment (vector defined by this next pair of coordinates passes through the region Ai, that pair of coordinates is sent to a register 67 and that portion of the line segment defined by the pair of coordinates which passes through the region Ai is determined and is stored in the memory 83 in the form of dot signals.

After the coordinate data has been transferred from the register 57 to the register 67, the register 57 again reads out a pair of coordinates from the second memory 51 for comparison, and if it is determined that a certain pair of coordinate data is the data to be sent to the register 67 and if processing in the register 67 has not been completed, the register 57 waits until the processing in the register 67 is completed, and when the processing is completed the next new pair of coordinate data are transferred to the register 67. In this manner, the second memory 51 is repeatedly read-out until all data are read-out, and the process waits until reading of dot signals from the memory 81 has been completed. After the recording of the region Ai-1 has been completed based on the dot signals read from the memory 81, switches 86 and 89 are switched to start the recording of the region Ai based on the dot signals read from the memory 83. While the region Ai is recorded, the coordinate data in the second memory 51 is read from the beginning and it is determined if the line segment defined by the coordinate passes through the region Ai+1, and if it so passes, the dot signals corresponding the locus of point so passing are stored in the memory 81.

Referring to FIG. 2, the present invention is explained in further detail. When start of recording to the record medium is directed and the read-out of the graphic coordinate information from the memory 51 is instructed by a controller 53, the read-out from the memory 51 begins. The graphic coordinate information thus read-out is supplied to a code decoder 55 and the first register stack 57. The code decoder 55 refers to tag bits of the bytes shown in FIG. 4 or function codes (not shown) in the coded signals to store the the first five-byte coordinate data for the start point (X, Y,) with the $X_1$ coordinate in register 571 and the $Y_1$ coordinate in register 573 of the register stack 57. The next five-byte data for the end point ($X_2$, $Y_2$) are stored with the $X_2$ register 575 and the $Y_2$ register 577. The sectioned regions Ai−1, Ai and Ai+1 of the record paper are shown in FIG. 5. At the time when the last byte of a vector data is stored, the comparator 59 determines if the vector includes the region Ai of FIG. 5. (It is assumed that the recording apparatus is currently recording the region Ai−1). The comparator 59 determines if the line segment passes through the region by comparing the Y coordinate of the current region Ai stored in a region discriminator 73 and the contents of the registers 573 and 577.

If the vector to be recorded does not pass through the region Ai, like a vector B shown in FIG. 5, the controller 53 transfers the end point data ($X_3$, $Y_3$) from the $X_2$ register 575 and the $Y_2$ register 577 in the register stack 57 to the $X_1$ register 571 and the $Y_1$ register 573, respectively. The start point data ($X_2$, $Y_2$) previously stored in the $X_1$ register 571 and the $Y_1$ register 573 are removed and the next data ($X_4$, $Y_4$) are stored from the memory 51 to the $X_2$ register 575 and the $Y_2$ register 577. As it is determined that the line segment B does not pass through the region Ai, the recording to the memory cells corresponding to the region Ai is not carried out.

The data can be transferred from the $X_2$, $Y_2$ registers to the $X_1$, $Y_1$ registers because the line segments ABC are continuous, having a common point ($X_2$, $Y_2$), as shown in FIG. 5. If they are not continuous, three sets of coordinates [($X_1$, $Y_1$), ($X_2$, $Y_2$)], [($X_2$, $Y_2$), ($X_3$, $Y_3$)] and [($X_3$, $Y_3$), ($X_4$, $Y_4$)] are stored in the memory 51 and the loading of the data to the register stack 57 is carried out three times.

When the vector defined by the data stored in the register stack 57 includes the region Ai like the vector A or C shown in FIG. 5, a busy flag in a flag register 65 (FIG. 2A) which indicates the operational status of linear interpolators 61 and 63 (FIG. 2B) is examined, and if the busy flag indicates the operation status, the controller 53 is rendered to a writing status and the read-out from the memory 51 is stopped. On the other hand, if the busy flag indicates the non-operation status, the controller 53 moves the contents of the register stack 57 to a second register stack 67 and sets a busy flag in the busy flag register 65. In response thereto, the linear interpolators 61 and 63 start the operation and the read-out of the next data train from the memory 51 to the register stack 57 is started. The linear interpolator 61 is a well-known digital differential analyzer (DDA) which generates pulses of a frequency indicative of the gradient of the line. For example, when y=x, the linear interpolators 61 and 63 produce the pulses simultaneously, and when y=2x, the linear interpolator 63 produces one pulse while the linear interpolator 61 produces two pulses. In this manner, the linear interpolators 61 and 63 produce the pulses indicative of the gradient of the line, and an X reversible counter 673 and a Y reversible counter 677 (which store the start point coordinates of the line segment) count toward the start point coordinates of the line segment so that the counts of the counters 673 and 677 represent the coordinates a line which extends from the start point at the calculated gradient.

A discriminator 26 determines if the end point of the line is in the region Ai or not, and if it is the region Ai, an output of the region discriminator 73 controls a memory controller 85 to store the dot signals representing the line in the memory using the contents of the counters 673 and 677 as the address.

If the discriminator 26 determines that the end point is out of the region Ai, the next data is loaded from the register stack 57 to the register stack 67. When the discriminator 26 determines that the end point is out of the area Ai, the frequency supplied to the counters is increased, and when it determines that the point is within the region Ai, the frequency is changed to a lower frequency suitable for writing to the memories 81 and 83 so that the processing speed is increased.

To repeat the explanation, after the vector data containing the region Ai have been transferred from the first register stack 57 to the second register stack 67, the controller 53 instructs the linear interpolators 61 and 63 to start the operation. The output pulses from the X linear interpolator 61 rapidly increase or decrease the count rate of the X reversible counter 673 depending on the output of the discriminator 69 which compares the magnitudes of the data stored in the X register 671 of the second register stack 67 and the X reversible counter 673.

The linear interpolators 61 and 63 may be digital differential analyzers. The output pulses of the Y linear comparator 63 rapidly increase or decrease the count rate of the Y reversible counter 677 of the second register stack 67 depending on the output of the discriminator 71. If the Y-coordinate of the vector represented by the output of the Y reversible counter 677 comes within the region Ai, the region discriminator 73 is activated. The clock signals 75 supplied to the linear interpolators 61 and 63 are counted down by the counter 77 to allow the writing to the memory. The frequency of the output signal from the counter 77 is selected to a frequency suitable to access the memories 81 and 83.

The writing to the memory cells of one of the memories 81 and 83 corresponding to the record position specified by the output of the X reversible counter 673 and the Y reversible counter 677 of the second register stacks 67 is carried out. The memory controller 85 decomposes the vector data into dots in accordance with the information contents such as line, dot and dash stored in the dot control register 679 of the register stack 67 and writes the dot information through the switch 86. By reducing the operation speed when the writing to the memory is required and increasing the operating speed in other modes, the number of vectors handled can be increased.

When the output of the Y reversible counter 677 indicates the change of the region from Ai to Ai+1 (addition) or to Ai−1 (subtraction), the region discriminator 73 actuates the switch 87. As a result, the operation of the linear interpolators 61 and 63 is stopped and the busy flag in the flag register 65 is reset.

When the Y reversible counter 677 is within the region Ai and the contents of the X register 671 and the X reversible counter 673 and the contents of the Y register 675 and the Y reversible counter 677 are equal, respectively, the operations of the linear interpolators 61 and 63 are stopped by the discriminators 69 and 71 and the busy flag in the flag register 65 is reset.

One of the memories 81 and 83 writes the data while the other reads the data. The memories 81 and 83 each has a memory capacity corresponding to a time long enough to process the vector data to be stored in the memory 51. For example, each of the memories 81 and 83 has an image memory capacity corresponding to a 64–128 scan lines.

The dot signals read from the memories 81 and 83 are supplied in parallel to the shift register 91 through the switch 89. The shift register 91 has the same construction as the shift register 41. By applying the clock signals from the clock generator 43 to the shift register 91 as the shift pulses, the dot signals representing the graphic information are sequentially produced in the same manner as the character information is processed. The above operation is repeated for each region specified by the scan line counter 35. When the record paper is divided into N regions, the operation is repeated N times to process the vector data.

Accordingly, by simultaneously reading the information from the memories 31 and 51 with the character processing unit 20 and the graphic pattern processing unit 25, the dot signals representing the character information and the dot signals representing the graphic information are simultaneously obtained in the shift register 41 and the shift register 91, respectively. Those dot signals are combined in a mixer 93 and the combined dot signals are supplied to a driver 95 for the light modulator 2 shown in FIG. 1. Thus, the laser beam L is modulated by the dot signals and the latent images of the character information and the graphic information are simultaneously formed on the surface of the photosensitive drum 6 which is the record medium. In this manner, the character information and the graphic information are simultaneously recorded.

By providing switches 101 and 103 between the shift register 41 and the mixer 93 and between the shift register 91 and mixer 93, respectively, it is possible to record only the graphic information when the switch 101 is opened or record only the character information when the switch 103 is opened.

While the recording apparatus which scans the record medium with a laser beam has been particularly explained, the present invention is not limited to such recording apparatus but it is applicable to other recording apparatus such as a CRT printer, multi-stylus printer and dot matrix printer. In each case, the driver 95 of FIG. 2 may be modified to match the particular printer.

What I claim is:

1. An output device for providing information with dots on an output medium that can be divided into a plurality of regions, comprising:

storage means for storing a start point coordinate of a line segment at one location and an end point coordinate of the line segment at a second location, the line segment constituting information to be provided on the output medium;

memory means having a memory capacity corresponding to a plurality of scanning lines on the output medium;

discrimination means for determining with the start point coordinate and the end point coordinate if at least a portion of the line segment is located within a region of the output medium corresponding to a plurality of the scanning lines on the output medium;

means for causing information representing the line segment to be stored in said memory means as a dot signal when said discrimination means determines that at least a portion of the line segment is located within the region;

means for moving the end point coordinate stored at the second location in said storage means to the first location storing the start point coordinate; and means for providing the information representing the line segment on the output medium in accordance with the dot signal derived from said memory means.

2. An output device according to claim 1, wherein said memory means comprises first and second memory units each having a memory capacity corresponding to the plurality of scanning lines on said output medium.

3. An output device according to claim 2, further comprising means for selectively applying either output of said first and second memory units to said providing means.

4. An output device according to claim 2, further comprising writing means for writing information into said memory means, and means for selecting one of said first and second memory units for receiving information from said writing means.

5. An output device for providing information with dots on an output medium that can be divided into a plurality of regions each comprising a plurality of scan lines, comprising:

reception means for receiving a start point coordinate and an end point coordinate of a line segment to be provided on the output medium;

memory means having a memory capacity large enough to store data corresponding to one of the plurality of regions on the output medium;

discrimination means for determining if at least a portion of the line segment is located in said one region;

means for generating pulses having a number that represents the gradient of the line segment;

means for writing a dot signal into said memory means in response to pulses generated by said generating means, when said discrimination means determines that said line segment is located in said one region; and output means for providing the information representing the line segment on the output medium in accordance with the dot signal derived from said memory means.

6. An output device according to claim 5, wherein said writing means comprises a plurality of pulse generators.

* * * * *